US008045833B2

(12) United States Patent
Wasserman et al.

(10) Patent No.: US 8,045,833 B2
(45) Date of Patent: Oct. 25, 2011

(54) CABLE COMPRISING A SHEAR THICKENING COMPOSITION

(75) Inventors: Scott H. Wasserman, Morganville, NJ (US); Jeffrey M. Cogen, Flemington, NJ (US); Timothy J. Person, Freehold, NJ (US); Laurence H. Gross, Bridgewater, NJ (US)

(73) Assignee: Union Carbide Chemials & Plastics Technology LLC, Midland, MI (US)

( * ) Notice: Subject to any disclaimer, the term of this patent is extended or adjusted under 35 U.S.C. 154(b) by 257 days.

(21) Appl. No.: 12/517,326

(22) PCT Filed: Nov. 29, 2007

(86) PCT No.: PCT/US2007/085828

§ 371 (c)(1), (2), (4) Date: Jun. 2, 2009

(87) PCT Pub. No.: WO2008/079584

PCT Pub. Date: Jul. 3, 2008

(65) Prior Publication Data

US 2010/0027948 A1 Feb. 4, 2010

(51) Int. Cl.

| | |
|---|---|
| ***G02B 6/44*** | (2006.01) |
| ***H01B 7/17*** | (2006.01) |
| ***H02G 15/00*** | (2006.01) |

(52) U.S. Cl. ........... 385/101; 385/113; 174/24; 523/173

(58) Field of Classification Search .................. 385/100, 385/101, 109, 110, 141, 113; 523/173, 218, 523/219, 491, 493, 570, 579; 174/24

See application file for complete search history.

(56) References Cited

U.S. PATENT DOCUMENTS

| | | | | |
|---|---|---|---|---|
| 4,366,075 | A | 12/1982 | Beach | 252/28 |
| 4,789,589 | A | 12/1988 | Baxter | 428/317.5 |
| 5,246,783 | A | 9/1993 | Spenadel et al. | 428/461 |
| 5,288,762 | A | 2/1994 | Park et al. | 521/79 |
| 5,340,840 | A | 8/1994 | Park et al. | 521/60 |
| 5,369,136 | A | 11/1994 | Park et al. | 521/143 |
| 5,387,620 | A | 2/1995 | Park et al. | 521/143 |
| 5,407,965 | A | 4/1995 | Park et al. | 521/81 |
| 5,433,872 | A | 7/1995 | Brauer et al. | 252/28 |
| 5,461,195 | A * | 10/1995 | Freeman et al. | 174/23 R |
| 5,505,773 | A | 4/1996 | Vitands et al. | 106/272 |
| 5,712,011 | A | 1/1998 | McMahon et al. | 428/36.9 |
| 5,841,072 | A | 11/1998 | Gagnon | 174/110 F |
| 6,496,629 | B2 | 12/2002 | Ma et al. | 385/113 |
| 6,658,185 | B2 * | 12/2003 | Bosisio et al. | 385/109 |
| 6,714,707 | B2 | 3/2004 | Rossi et al. | 385/109 |
| 7,105,749 | B2 | 9/2006 | Belli et al. | 174/110 R |
| 7,253,217 | B2 * | 8/2007 | Sohal | 523/218 |
| 7,466,887 | B2 * | 12/2008 | Castellani et al. | 385/109 |
| 2003/0049002 | A1 * | 3/2003 | Bosisio et al. | 385/109 |
| 2004/0063812 | A1 | 4/2004 | Sohal | 523/200 |
| 2005/0137290 | A1 * | 6/2005 | Hagen et al. | 523/219 |
| 2005/0266748 | A1 | 12/2005 | Wagner et al. | 442/59 |
| 2006/0234572 | A1 | 10/2006 | Wagner et al. | 442/59 |
| 2010/0027948 | A1 * | 2/2010 | Wasserman et al. | 385/101 |

FOREIGN PATENT DOCUMENTS

| | | |
|---|---|---|
| EP | 0058022 | 8/1982 |
| WO | 2006026256 | 3/2006 |

* cited by examiner

*Primary Examiner* — Brian Healy

(74) *Attorney, Agent, or Firm* — Whyte Hirschboeck Dudek SC

(57) ABSTRACT

Shear thickening compositions can function in an energy or communications transmission cable to provide enhanced protection against externally applied forces, e.g., cutting or puncture from a shovel. As a free or bound layer, or when used via impregnation into a substrate used for an internal component or wrap, the shear thickening composition provides protection against mechanical damage that far surpasses conventional technologies. In foamable compositions for cable components, the shear thickening composition provides enhanced integrity of the polymer melt for enhanced foam performance. As a flame retardant component, the shear thickening composition provides an enhanced char formation mechanism for superior flame retardance.

20 Claims, No Drawings

CABLE COMPRISING A SHEAR THICKENING COMPOSITION

FIELD OF THE INVENTION

This invention relates to cables. In one aspect, the invention relates to energy and communication cables while in another aspect, the invention relates to a method of protecting such cables from damage due to externally applied forces. In still another application, the invention relates to cables comprising a shear thickening composition.

BACKGROUND OF THE INVENTION

Energy and communication transmission cables are susceptible to damage by many different means, including puncture by shovels, trucks and other equipment, plus bullets, arrows, and other projectiles. Cables are designed to resist such damage using thick insulating plastic layers, metal armor layers, and the like. One design is double or multiple layering of insulating and/or protective coatings about a conductive element such as those taught in U.S. Pat. Nos. 4,789,589, 5,841,072 and 7,105,749. Another design comprises polymer-coated metal shielding and armoring products such as ZETABON™ metallic armor products available from The Dow Chemical Company. One variation on this design is the replacement of the metal layer with a foamed polymer layer, e.g., a foamed polypropylene layer.

Still another design is the use of a buffer tube containing a thixotropic, water-blocking gel such as that taught in U.S. Pat. Nos. 6,714,707, 6,496,629 and 5,505,773. Yet another design is the use of a grease composition as a cable filling material such as that taught in U.S. Pat. No. 5,433,872. These grease compositions comprise a polyol having a molecular weight of at least 4,000 and an agent, e.g., colloidal particles, that imparts thickening to the polyol. US Patent Application Publication 2004/0063812 A1 teaches a cable filling material that is a dispersion of microspheres and a gel comprising an oily base and an organic polymeric gelling agent.

As effective as these existing damage-resistant technologies are, more effective systems are desired. Repairing and/or replacing damaged cable is costly and time-intensive; the costs and inconveniences associated with the loss of use of a damaged cable can be substantial; and the human injuries and property loss that can be incurred from damaging a cable, e.g., a high-energy power cable, can be terrible. Consequently, the ability to incorporate into a cable design a free or bound material that shows extreme resistance to externally applied forces would be a considerable advance in the cable protection art.

SUMMARY OF THE INVENTION

In one embodiment, the invention is a cable comprising a conductor surrounded by a shear thickening fluid system encased in a cable jacket. The conductor can be designed to conduct electricity or light, and the shear thickening fluid system is a combination of particles suspended in a carrier or low viscosity fluid. The cable jacket can be made from any suitable material, e.g., metal, plastic, etc., and often it is made from a polymeric material such as a polyolefin. The cable can include other structural components such as one or more insulation layers, core or buffer tube structures, semiconductive shields, strengthening wires or elements, and metallic tape shields.

The manner in which the shear thickening fluid is dispersed within the cable can vary widely. In one embodiment, the shear thickening fluid is dispersed with the polymer matrix of a cable jacket. In another embodiment, the shear thickening fluid is dispersed within a polymer matrix that is co-extruded, coated or laminated with the cable jacket. In that embodiment the jacket is present as the outside layer, i.e., the layer exposed to the environment, and the polymer matrix containing the shear thickening fluid is present as the inside layer, i.e., the layer facing the interior of the cable. In still another embodiment, the shear thickening fluid constitutes a discreet layer not polymer bound within the cable, e.g., as a coating on another layer within the cable such as a buffer tube or semiconductive wrap, or carried on a tape or fabric and wrapped about the one or more inner components of the cable. In still another embodiment, the shear thickening fluid is contained within a cable component comprising fibers or yarns that are otherwise present in the cable design to enhance cable properties such as tensile strength. In that embodiment, such yarns or fibers can be loosely contained within the cable structure, or they can be contained within other structural components, such as core tubes or buffer tubes. In yet another embodiment, the shear thickening fluid is a loose or unbound fluid filling one or more channels within the cable.

In another embodiment, the invention is the use of a shear thickening fluid to enhance the abuse or impact resistance of a foamed or expanded polymeric system that is used as an insulation layer in a cable. The shear thickening fluid can be included in the polymer matrix or within the cells of the foamed polymer. Cable insulation layers comprising foamed polymeric systems can reduce signal attenuation and can add physical performance to a cable.

In another embodiment, the invention is the use of a shear thickening fluid to form a high quality char-forming flame retardant system in which the filler system required for flame retardant performance is incorporated in part or in whole into the shear thickening fluid component, or alternatively, is supplemented by the filler in the shear thickening fluid. Flame retardant polymer compositions are often used in outer and inner layers or components of a cable to protect against damage to the cable or the surrounding environment during a fire. The use of shear thickening materials in flame retardant systems can result in superior performance of the system under circumstances that induce a shear thickening response. The cables of this embodiment features both flame retardant and shear thickening functionality.

DESCRIPTION OF THE PREFERRED EMBODIMENTS

"Cable", "power cable", "transmission line" and like terms mean at least one wire or optical fiber within a protective jacket or sheath. Typically, a cable is two or more wires or optical fibers bound together, typically in a common protective jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Shear thickening fluid", "extreme shear thickening fluid", "STF", "ESTF" and like terms mean a liquid composition that demonstrates a large, sometimes discontinuous increase in viscosity with increasing shear stress. Shear thickening fluids can comprise one or more fillers that are functional in the shear thickening behavior of the fluid, in addition to other components to the extent that these other components do not materially interfere with the shear thickening response of the fluid to increasing stress.

The shear thickening fluids used in the practice of this invention are known in the art, and are generally described in US Patent Application Publication US 2005/0266748 A1. These fluids are typically a combination of particles suspended in a solvent. The particles used can be made of various materials, such as, but not limited to, a mineral oxide such as silicon dioxide, a metal carbonate such as calcium carbonate, or an organic polymer such as polystyrene or polymethylmethacrylate, or a polymer made by emulsion polymerization. The particles can be stabilized in solution or dispersed by charge, Brownian motion, adsorbed surfactants, and adsorbed or grafted polymers, polyelectrolytes, polyampholytes, or oligomers. Particle shapes include spherical particles, elliptical particles, or disk-like or clay particles. The particles may be synthetic and/or naturally occurring minerals. Also, the particles can be mono-disperse, bi-disperse, or poly-disperse in size and shape.

The particle size can vary to convenience, but typically the particle size is less than the about 1, preferably less than about 0.5 and more preferably less than about 0.25, micron (μm) so that the particles can be easily incorporated within a cable construction so as to fill any interstices that may exist between and among cable components with which the STF is in contact, e.g., conductor and semiconductor shield, insulation and semiconductor shield, etc.

The carrier fluids that are used can be aqueous in nature (i.e. water with or without added salts, such as sodium chloride, and buffers to control pH) for electrostatically stabilized or polymer stabilized particles, or organic (such as ethylene glycol, polyethylene glycol, ethanol), or silicon based (such as silicon oils, phenyltrimethicone). The carrier fluids can also be composed of compatible mixtures of carrier fluids, and may contain free surfactants, polymers, and oligomers. The carrier fluids are preferably environmentally stable so that they remain integral to the cable and the particles suspended during service.

The particles are suspended in the carrier fluid and should produce a fluid that has the shear thickening property. Shear thickening does not require a dilatant response, i.e. it may not be associated with an increase in volume such as often observed in dry powders or sometimes in suspensions of larger particles, e.g., particles with a size greater than 100 microns. The fluid may be diluted with a second carrier fluid.

To protect a cable from externally applied forces, the shear thickening fluid is preferably located directly beneath the outermost layer of the cable such that deformation by mechanical means would shear thicken the material and thus protect the innermost components of the cable from damage. The fluid can be loosely applied by injection during cable fabrication, or it can be bound to the outermost layer, or to an armor layer, or another inner layer. The STF can also be impregnated into one of many possible substrates, e.g., plastic, fabric, etc., then used to bound or wrap the inner components of the cable, such as central tubes, core tubes, buffer tubes, single wires, twisted pairs of wires, etc. The shear thickening fluid can also be used to fill or flood the interstices around individual components in the interior of a cable, or the space between multiple inner layers of the cable design.

The cable can comprise one or more materials of construction that are suitable for its ultimate end use, e.g., power transmission, communication, above or below ground, undersea, etc., and it can take any suitable construction. Representative polymers from which the cable can be constructed include polyolefin, polyester, polyamide, polyether, polymeric fluorocarbon, polyurethanes, polysiloxanes and the like, and the cable can take any one of a number of different designs such as those illustrated in U.S. Pat. Nos. 5,246,783, 6,496,629 and 6,714,707.

In another embodiment, the shear thickening fluid can be added to a foamable insulation composition such that the foaming process will provide the shear thickening fluid to the walls of the cells comprising the foamed material to provide shear thickening behavior in the foamed material. The shear thickening provides an efficient system for achieving desirable bubble size and distribution while also providing a resilient and protective foam layer. In another embodiment, the shear thickening fluid is added to the interior of the cells of the foamed material, thus enhancing the protective properties of the foamed material.

The shear thickening fluid can be included in any foam composition, e.g., polyurethane, polyolefin, etc., and used in any foaming process, e.g., those using chemical or physical blowing agents, crosslinking or non-crosslinking, etc. Representative foam compositions and processes are described in U.S. Pat. Nos. 5,288,762, 5,340,840, 5,369,136, 5,387,620 and 5,407,965 and the *Handbook of Polymer Foams and Technology*, edited by D. Klempner and K. C. Frisch, Hanser Publishers, Munich, Vienna, New York, Barcelona (1991). The amount and manner of use of the shear thickening fluid in these foam compositions and foaming processes is well within the skill of the ordinary artisan.

In still another embodiment, a shear thickening system can be a component in a flame retardant system (with the matrix provided by a material that is fluid at room temperature or at the temperature of the bum). These systems can comprise halogenated and non-halogenated fillers, both conventionally sized and nano-sized, which contribute to the char-forming performance of the cable under fire conditions.

Non-limiting examples of polymers that can be rendered fire-retardant or fire-resistant through the use of a fire retardant and a shear thickening fluid include polyolefins (including those listed in WO2006026256), polyamides, polystyrenes, acrylic resins, polyvinyl chlorides, polyurethanes, polyesters, or such polymers further comprising silane functional groups, epoxy functional groups, or other functional groups that will react to crosslink the polymer resin in the presence of water.

Representative flame retardants and fillers include talc, calcium carbonate, organo-clay, glass fibers, marble dust, cement dust, feldspar, silica or glass, fumed silica, silicates, alumina, various phosphorus compounds, ammonium bromide, antimony trioxide, antimony trioxide, zinc oxide, zinc borate, barium sulfate, silicones, aluminum silicate, calcium silicate, titanium oxides, glass microspheres, chalk, mica, clays, wollastonite, ammonium octamolybdate, intumescent compounds, expandable graphite, and mixtures of two or more of these materials. The fillers may carry or contain various surface coatings or treatments, such as silanes, fatty acids, and the like. Halogenated organic compounds including halogenated hydrocarbons such as chlorinated paraffin, halogenated aromatic compounds such as pentabromotoluene, decabromodiphenyl oxide, decabromodiphenyl ethane, ethylene-bis(tetrabromophthalimide), dechlorane plus and other halogen-containing flame retardants. One skilled in the art will recognize and select the appropriate halogen agent consistent with the desired performance of the composition. The composition can further comprise various other additives. Moisture cure catalysts, such as dibutyltin dilaurate or distannoxanes, are normally added for moisture-curable resins. Peroxides and free-radical initiators can be added for crosslinking the resin. Additionally, pigments and fillers may be added as desired.

The composition can contain other additives such as, for example, antioxidants (e.g., hindered phenols such as, for example, IRGANOX™1010 a registered trademark of Ciba Specialty Chemicals), phosphites (e.g., IRGAFOS™168 a registered trademark of Ciba Specialty Chemicals), UV stabilizers, cling additives, light stabilizers (such as hindered amines), plasticizers (such as dioctylphthalate or epoxidized soy bean oil), thermal stabilizers, mold release agents, tackifiers (such as hydrocarbon tackifiers), waxes (such as polyethylene waxes), processing aids (such as oils, organic acids such as stearic acid, metal salts of organic acids), crosslinking agents (such as peroxides or silanes), colorants or pigments to the extent that they do not interfere with desired physical or mechanical properties of the compositions of the present invention, and other flame retardant additives. The above additives are employed in functionally equivalent amounts known to those skilled in the art, generally in amounts of up to about 65 percent by weight, based upon the total weight of the composition.

The compositions of the present invention can be processed to fabricate articles by any suitable means known in the art. For example, the compositions can be processed to films or sheets or to one or more layers of a multilayered structure by know processes, such as calendering, blowing, casting, extrusion or co-extrusion processes. Injection molded, compression molded, extruded or blow molded parts can also be prepared from the compositions that include a shear thickening fluid.

Although the invention has been described in considerable detail by the preceding specification, this detail is for the purpose of illustration and is not to be construed as a limitation upon the following appended claims. All U.S. patents, allowed U.S. patent applications and U.S. Patent Application Publications are incorporated herein by reference.

What is claimed is:

1. A cable comprising a conductor surrounded by a shear thickening fluid encased in a cable jacket.

2. The cable of claim 1 in which the shear thickening fluid comprises a carrier fluid and particles, the particles comprising at least one of a mineral oxide, metal carbonate or an organic polymer.

3. The cable of claim 2 in which the mineral oxide is silicon dioxide.

4. The cable of claim 2 in which the metal carbonate is calcium carbonate.

5. The cable of claim 2 in which the organic polymer is at least one of polystyrene or polymethylmethacrylate.

6. The cable of claim 2 in which the particle size is less than the about 1 micron.

7. The cable of claim 6 in which the conductor comprises copper or aluminum.

8. The cable of claim 6 in which the conductor comprises at least one fiber optic strand.

9. The cable of claim 6 in which the carrier fluid comprises water.

10. The cable of claim 6 in which the carrier fluid comprises at least one of ethylene glycol, polyethylene glycol, ethanol, or a silicon-based fluid.

11. A cable construction in which a filler system necessary for imparting flame retardance to the cable is incorporated in part or in whole into a shear thickening fluid.

12. A cable construction in which a shear thickening fluid is supplemented by a filler system necessary for imparting flame retardance to the cable.

13. The cable of claim 1 in which the cable jacket comprises a polymeric material and the shear thickening fluid is dispersed within the material.

14. The cable of claim 1 in which the shear thickening fluid is dispersed within a polymer material that is co-extruded with, laminated to, or coated onto a polymeric cable jacket.

15. The cable of claim 1 in which the shear thickening fluid is a discrete layer within the cable.

16. The cable of claim 15 in which the shear thickening fluid is carried on a tape or fabric that is wound about one or more components of the cable other than the cable jacket.

17. The cable of claim 1 in which the shear thickening fluid is carried within a layer of loose fibers or within a yarn or thread.

18. The cable of claim 17 in which the yarn or thread is contained within another structural component of the cable.

19. The cable of claim 18 in which the other structural component is at least one of a core tube and a buffer tube.

20. The cable of claim 1 in which the shear thickening fluid is dispersed loose and unbound within channels of the cable.

* * * * *